United States Patent [19]

Spaeth

[11] Patent Number: 6,021,238
[45] Date of Patent: Feb. 1, 2000

[54] OPTOELECTRONIC MODULE FOR BIDIRECTIONAL OPTICAL DATA TRANSMISSION

[75] Inventor: Werner Spaeth, Hozlkirchen, Germany

[73] Assignee: Simens Aktiengesellschaft, Muenchen, Germany

[21] Appl. No.: 08/941,371

[22] Filed: Sep. 30, 1997

[30] Foreign Application Priority Data

Sep. 30, 1996 [DE] Germany ............................ 196 40 423

[51] Int. Cl.[7] .............................. G02B 6/26; G02B 6/36
[52] U.S. Cl. .................... 385/31; 385/33; 385/88
[58] Field of Search .................... 385/31, 33, 36, 385/42, 47, 92, 88, 89, 93, 94

[56] References Cited

U.S. PATENT DOCUMENTS

| | | | |
|---|---|---|---|
| 4,431,258 | 2/1984 | Fye | 385/129 |
| 4,767,171 | 8/1988 | Keil et al. | 385/35 |
| 5,035,483 | 7/1991 | Waitl et al. | 385/14 |
| 5,040,868 | 8/1991 | Waitl et al. | 385/88 |
| 5,146,516 | 9/1992 | Blumke et al. | 385/36 |
| 5,552,918 | 9/1996 | Krug et al. | 385/33 |
| 5,611,006 | 3/1997 | Tabuchi | 385/14 |

FOREIGN PATENT DOCUMENTS

| | | |
|---|---|---|
| 0 644 668 A1 | 3/1995 | European Pat. Off. . |
| 0664585A1 | 7/1995 | European Pat. Off. . |
| 9400896 | 4/1994 | Germany . |
| 4424013C1 | 7/1995 | Germany . |
| 0182808 | 7/1989 | Japan ...................................... 385/36 |

OTHER PUBLICATIONS

Japanese Patent Abstract 05045549 (Seiichi), dated Feb. 23, 1993.

German Utility Model G 94 00 896.5, dated Mar. 3, 1994.

Primary Examiner—John D. Lee
Assistant Examiner—Juliana K. Kang
Attorney, Agent, or Firm—Herbert L. Lerner; Laurence A. Greenberg

[57] ABSTRACT

An optoelectronic module for bidirectional optical data transmission includes a molded part acting as a beam-splitter device, formed substantially of a material transparent to emitted radiation and received radiation and having a beam-splitter layer embedded therein. A transmit component, a receive component and a radiation-focusing device are directly connected to the molded part and are provided with a sealing jacket.

38 Claims, 5 Drawing Sheets

Fig. 1

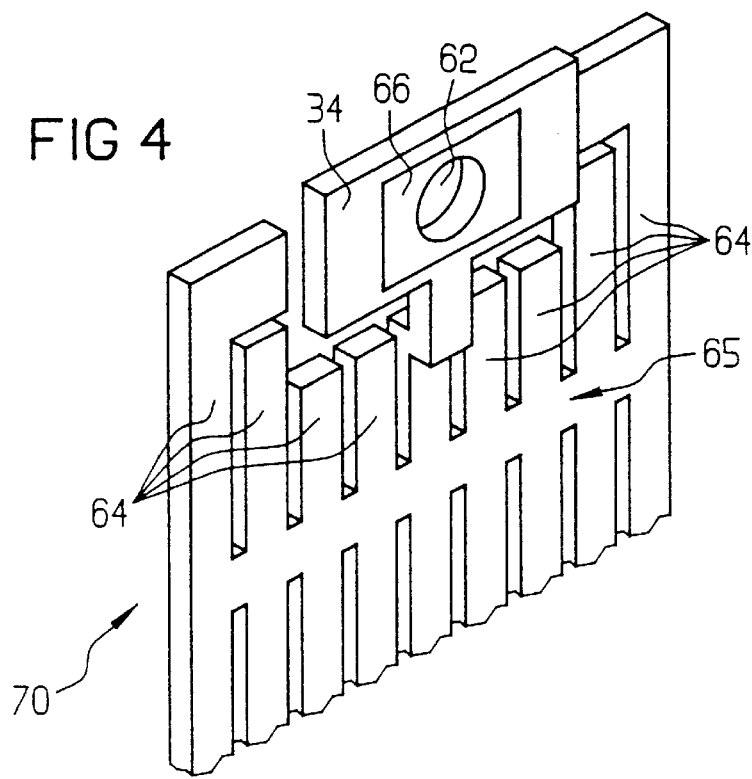
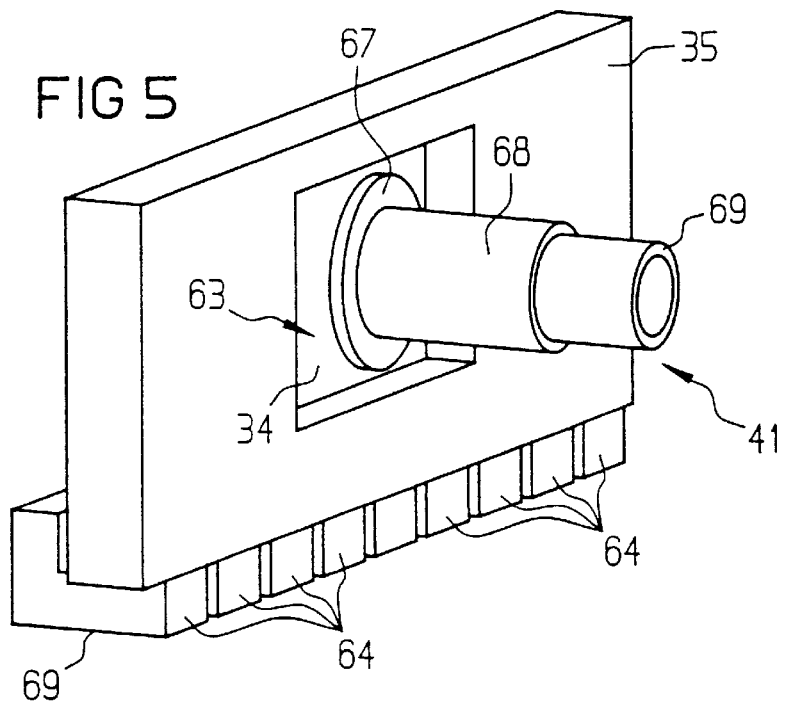

OPTOELECTRONIC MODULE FOR BIDIRECTIONAL OPTICAL DATA TRANSMISSION

BACKGROUND OF THE INVENTION

FIELD OF THE INVENTION

The invention relates to an optoelectronic module for bidirectional optical data transmission, in particular through the use of a single optical fiber, in which a transmit component for emitting radiation, a receive component for receiving radiation, a beam-splitter device with a beam-splitter layer and a radiation-focusing device for focusing radiation are constructed and disposed relative to one another in such a way that during operation of the optoelectronic module at least a portion of radiation emitted by the transmit component is coupled into an optical device, in particular into an optical fiber, coupled optically to the optoelectronic module, and at least a portion of received radiation released from the optical device is coupled into the receive component.

Such a module is disclosed, for example, in Published European Patent Application 0 664 585 A1, in which a transmit and receive module for bidirectional optical message and signal transmission is described. In that known module, a laser chip is disposed on a common carrier between two carrier parts having side surfaces, adjacent the resonator surfaces of the laser chip, which are provided with reflective coatings and are inclined at an angle of 45° to the resonator surfaces. Radiation emitted by the laser chip parallel to the surface of the common carrier is deflected by one of the side surfaces through 90° in the direction of a lens-coupling optical system which is fastened to the carrier part and couples the radiation into an optical fiber. Radiation released from the optical fiber, and to which the reflective coatings and the material of the carrier parts as well as of the common carrier is at least partially transparent, is received by a photodiode disposed below the common carrier. The device, including a laser chip, photodiode, common carrier and carrier parts, is installed in a hermetically sealed metal housing with a window.

The mounting of the individual constituents of an optoelectronic module of such construction is very complicated. It requires a large number of method steps, the adjustment of the individual constituents relative to one another is difficult, and the metal housing is very expensive. Moreover, large reflection losses occur due to the air gap between the lens and the reflective coating.

SUMMARY OF THE INVENTION

It is accordingly an object of the invention to provide an optoelectronic module for bidirectional optical data transmission, which overcomes the hereinafore-mentioned disadvantages of the heretofore-known devices of this general type, which requires the lowest possible outlay for mounting, which permits individual components to be adjusted relative to one another as simply as possible and which has no reflection losses.

With the foregoing and other objects in view there is provided, in accordance with the invention, an optoelectronic module coupled optically to the optical device for bidirectional optical data transmission, comprising a functional unit including a transmit component, a receive component and a beam-splitter device; the transmit component having a beam-exit surface for emitting radiation to be at least partially coupled into the optical device during operation; the receive component having a beam-entry surface for at least partially receiving and coupling-in radiation released from the optical device during operation; the beam-splitter device having a beam-splitter layer; a radiation-focusing device having a beam-entry and beam-exit surface for focusing radiation; the beam-splitter layer defining an interspace with the beam-exit surface, an interspace with the beam-entry surface and an interspace with the beam-entry and beam-exit surface; radiation-transparent material, such as a solid or viscous medium, at least partially filling each of the interspaces; a common sealing jacket for at least the transmit component, the receive component and the beam-splitter device; and a lead frame connected to the functional unit, the lead frame having electric terminal lugs electrically connected to the transmit component and the receive component.

The transmit-component beam-exit surface is that side surface of the transmit component through which the largest portion of radiation generated in the transmit component exits therefrom. Likewise, the receive-component beam-entry surface is that side surface of the receive component through which radiation to be received by the receive component is to be coupled. The beam-entry and beam-exit surface of the radiation-focusing device is that side surface of the radiation-focusing device through which the radiation emitted by the transmit component penetrates into the radiation-focusing device and through which radiation received by the radiation-focusing device from the optical device exits from the radiation-focusing device.

In accordance with another feature of the invention, the beam-splitter device is a molded part which has at least a first side surface, a second side surface and a third side surface, and which is formed essentially of a material transparent to the emitted radiation and the received radiation, and in which the beam-splitter layer is embedded. The first side surface and the second side surface are inclined to one another, in particular perpendicular to one another. Likewise, the third side surface and the second side surface or the third side surface and the first side surface are inclined to one another, in particular perpendicular to one another. The first side surface and the third side surface or the second side surface and the third side surface are opposite side surfaces of the molded part and are, in particular, parallel to one another. The transmit-component beam-exit surface faces the first side surface of the molded part and bears against the latter or is connected to the latter through the use of a radiation-transparent connecting device. Furthermore, the receive-component beam-entry surface faces the second side surface of the molded part and bears against the latter or is connected to the latter through the use of a radiation-transparent connecting device. The beam-entry and beam-exit surface of the radiation-focusing device faces the third side surface of the molded part and bears against the latter or is connected to the latter through the use of a radiation-transparent connecting device.

This configuration of the beam-splitter device as a molded part has the particular advantage that its side surfaces can be used as reference and adjustment surfaces for all of the components of the optoelectronic module mentioned at the outset. A further particular advantage of the just-described advantageous embodiment of the optoelectronic module according to the invention is its very low space requirement.

In each case a radiation-transparent medium such as, for example, a transparent synthetic resin which fills up any gaps present between the individual surfaces, may serve as the connecting device. It is particularly advantageous when the transmit-component beam-exit surface makes physical contact with the first side surface, that is to say when the distance between the transmit component beam-exit surface and the first side surface is smaller than or equal to a tenth of the wavelength of the emitted radiation. Ideally, the transmit-component beam-exit surface is situated on the first side surface. An analogous statement holds for the receive-component beam-entry surface and the beam-entry and beam-exit surface of the radiation-focusing device. An optoelectronic module according to the invention which is constructed in such a way advantageously only has very low internal reflection losses.

In accordance with a further feature of the invention, the beam-splitter device is produced from at least two joined optical prisms, and the beam-splitter layer is disposed between the two optical prisms. As a result, it is advantageously possible to realize a simple, and thus cost effective production method for large batches of the beam-splitter device.

In accordance with an added feature of the invention, the molded part has the form of a cuboid, the beam-splitter layer is situated in a diagonal cutting surface of the cuboid, and a cutting surface of the cuboid which is situated perpendicular to the beam-splitter layer takes the form of a rectangle, in particular the form of a square. So-called prism tubes of this type can advantageously be produced in a particularly simple way in large batches.

In accordance with an additional feature of the invention, the radiation-focusing device has a carrier part to which the beam-splitter device and the transmit component are fastened. The carrier part is formed essentially of a material transparent to the emitted radiation and the received radiation, and the transmit component and the radiation-focusing device are disposed on opposite sides of the carrier part. As a result, it is advantageously possible, in particular, to greatly reduce the overall size of the optoelectronic module and, in particular, to further reduce the radiation losses in the optoelectronic module.

In accordance with yet another feature of the invention, the carrier part is constructed in one piece together with the radiation-focusing device.

In accordance with yet a further feature of the invention, there is provided a monitor diode which has a monitor-diode beam-entry surface facing a fourth side surface of the molded part. Once again, the monitor-diode beam-entry surface in this case is that side surface of the monitor diode through which radiation to be detected by the monitor diode penetrates into the latter. The monitor diode is also advantageously enclosed by the common sealing jacket.

The first side surface and the fourth side surface of the molded part are disposed in such a way that during operation of the optoelectronic module at least a portion of the emitted radiation passing through the beam-splitter layer impinges on the monitor-diode beam-entry surface. They constitute, for example, opposite side surfaces of the molded part and, in particular, are parallel to one another. In this case, for example, the second and the third side surfaces are also mutually opposite side surfaces of the molded part, which are, in particular, parallel to one another. It is advantageous for the monitor diode to likewise be fastened to the carrier part and for any gap present between the monitor-diode beam-entry surface and the fourth side surface of the molded part to be filled with a transparent material.

In accordance with yet an added feature of the invention, the molded part has the form of a cuboid, the beam-splitter layer is situated in a diagonal cutting surface of the cuboid, a cutting plane of the cuboid at right angles to the beam-splitter layer has the form of a rectangle, in particular a square, and the second and third side surfaces are mutually opposite side surfaces of the molded part, with the result that the radiation-focusing device and the receive component are disposed on mutually opposite sides of the molded part, the beam axis of the emitted radiation and the beam axis of the received radiation enclose an angle of 90°, the beam-splitter layer is constructed and disposed in such a way that it for the most part reflects the emitted radiation, or with the result that the beam axis of the reflected radiation extends parallel to the beam axis of the received radiation and that it allows at least a portion of the received radiation to pass through, with the result that that portion impinges on the receive-component beam-entry surface.

In accordance with yet an additional feature of the invention, the molded part has the form of a cuboid, the beam-splitter layer is situated in a diagonal cutting surface of the cuboid, a cutting surface of the cuboid which is perpendicular to the beam-splitter layer has the form of a rectangle, in particular of a square, and the first and third side surfaces are mutually opposite side surfaces of the molded part, with the result that the radiation-focusing device and the transmit component are disposed on mutually opposite sides of the molded part, the beam axis of the emitted radiation and the beam axis of the received radiation extend in an essentially parallel manner to one another, and the beam-splitter layer is constructed and disposed in such a way that it allows a portion of the emitted radiation to be coupled into the optical device to pass through and for the most part reflects the received radiation and deflects it to the receive component.

In accordance with again another feature of the invention, there is provided a blocking filter which is as far as possible non-transparent to the wavelength of the emitted radiation and is disposed between the receive component and the second side surface of the molded part. It is possible as a result, in particular, to reduce crosstalk, that is to say direct transmission of signals from the transmit component to the receive component.

In accordance with again a further feature of the invention, the radiation-focusing device has a carrier part which is connected through the use of a radiation-transparent connecting device to the molded part, the carrier part essentially is formed of a material transparent to the emitted radiation and the received radiation, and the transmit component and the optical device are disposed on mutually opposite sides of the carrier part, the transmit component, the molded part and, if appropriate the monitor diode are fastened to a first main surface of the carrier part, the carrier part is fastened with a second main surface opposite the first main surface to a carrier plate of the lead frame, and the carrier plate has a bore above, below or in which the radiation-focusing device is disposed.

In accordance with again an added feature of the invention, the transmit component, the receive component, the beam-splitter device, the radiation-focusing device, the carrier part, the carrier plate and subregions of the electric terminal lugs and, if appropriate, the monitor diode are enclosed by the sealing jacket, and on the side of the carrier plate opposite the carrier part and in the region of the bore the sealing jacket has a cutout reaching as far as the carrier plate. It is advantageously possible in such an optoelectronic module according to the invention for an optical-fiber connecting device to be mounted on the carrier plate in the region of the bore.

In accordance with a concomitant feature of the invention, the electric terminal lugs project out of the sealing jacket through a single side surface thereof or through mutually opposite side surfaces thereof. All of the electric terminal lugs are bent uniformly outside the sealing jacket at least once by 90° in the same direction or are bent firstly by 90° uniformly in the same direction and then uniformly either by 90° inward in the direction of the middle of the module or outward away from the module, with the result that the optoelectronic module has a surface-mounting structure.

The following are method steps of a preferred method for simultaneously producing at least two optoelectronic modules through utility assembly in which the radiation-focusing device respectively has a carrier part to which the beam-splitter device and the transmit component are fastened, in which the carrier part essentially is formed of a material transparent to the emitted radiation and the received radiation, and in which the transmit component and the radiation-focusing device are disposed on mutually opposite sides of the carrier part:

a) production of a wafer formed of a material transparent to the emitted radiation and the received radiation, b) construction of at least two radiation-focusing devices on or application of the latter to, a main surface of the wafer in such a way that in each case one interspace is present between two radiation-focusing devices, c) application of a prism bar to the wafer, with a beam-splitter layer embedded along the longitudinal central axis of the prism bar, the beam-splitter layer situated on one of its diagonal planes, and the beam-splitter layer situated over the radiation-focusing device, d) application of at least two transmit components to the wafer in such a way that the beam-exit surfaces of the transmit components in each case face a first side surface of the prism bar, and a single one of the radiation-focusing devices is assigned to each transmit component, e) application of at least two receive components to the prism bar in such a way that a single one of the radiation-focusing devices is assigned to each receive component, f) optional application of at least two monitor diodes to the wafer in such a way that a single one of the transmit components is assigned to each monitor diode, g) respectively severing the wafer and, if appropriate, the prism bar in an interspace between two radiation-focusing devices in such a way as to produce functional units that are separated from one another and of which each has a carrier part, a beam-splitter device, a transmit component, a monitor diode if appropriate, a receive component and a radiation-focusing device, h) mounting the functional units onto a conductor strip which has a plurality of carrier plates with assigned electric terminal lugs, with a separate carrier plate provided for each functional unit, i) covering the functional units including the associated carrier plate and subregions of the associated electric terminal lugs with the sealing jacket, and j) severing the conductor strip, in each case between two optoelectronic modules.

For the sake of completeness, it may be mentioned at this juncture that in semiconductor technology the simultaneous production of a multiplicity of similar components in a wafer assembly is termed utility assembly.

Other features which are considered as characteristic for the invention are set forth in the appended claims.

Although the invention is illustrated and described herein as embodied in an optoelectronic module for bidirectional optical data transmission, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS:

FIG. 4 is a fragmentary, perspective view of a lead frame for an optoelectronic module according to the invention;

FIG. 5 is a perspective view of an optoelectronic module according to the invention.

Figure 1:
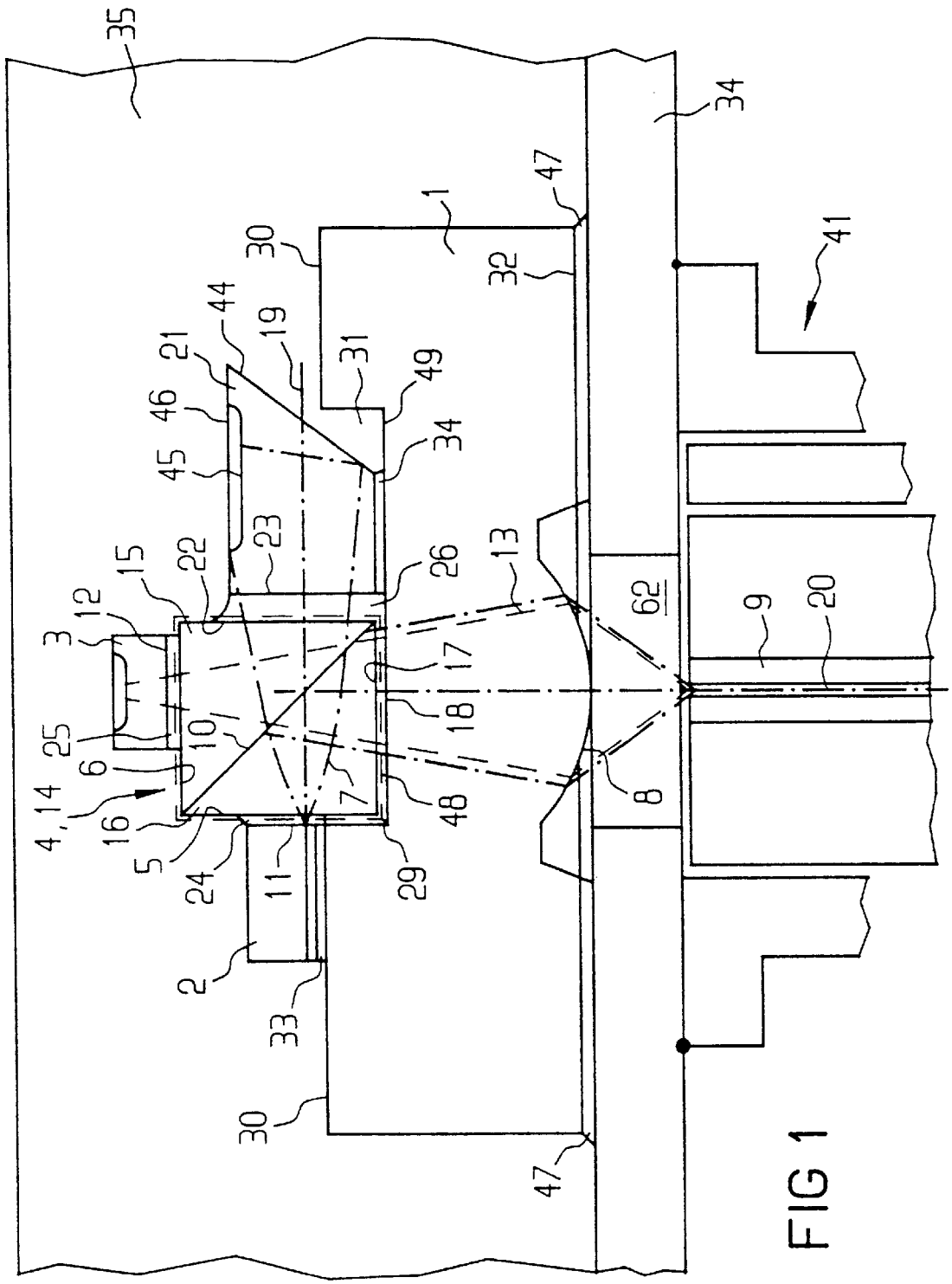
FIG. 1 is a fragmentary, diagrammatic, sectional view of a first exemplary embodiment of an optoelectronic module according to the invention.

DESCRIPTION OF THE PREFERRED EMBODIMENTS:

Referring now in detail to the figures of the drawings, in which identical or identically acting elements are provided with the same reference symbols, and first, particularly, to FIG. 1 thereof, there is seen an optoelectronic module according to the invention, in which a cutout 31 is formed in a first main surface 30 of a carrier part 1, and a radiation-focusing device 8 for focusing the radiation, in this case a spherical or aspherical collector lens, is constructed on a second main surface 32 of the carrier part 1, which is opposite the first main surface 30. A prism cube 14 is fastened as a beam-splitter device 4 to a base surface 49 of the cutout 31 through the use of a radiation-transparent connecting device 29, for example a transparent adhesive. The prism cube 14 includes two joined optical prisms 15, 16 between which a beam-splitter layer 10 is disposed. The beam-splitter layer 10 is situated on a diagonal plane of the prism cube 14. Of course, this exemplary embodiment is not restricted exclusively to the use of a prism cube 14. Instead of the prism cube, it is also likewise possible to use, for example, a prism cuboid with a square or rectangular cutting surface situated perpendicular to the beam-splitter layer 10.

Figure 2:
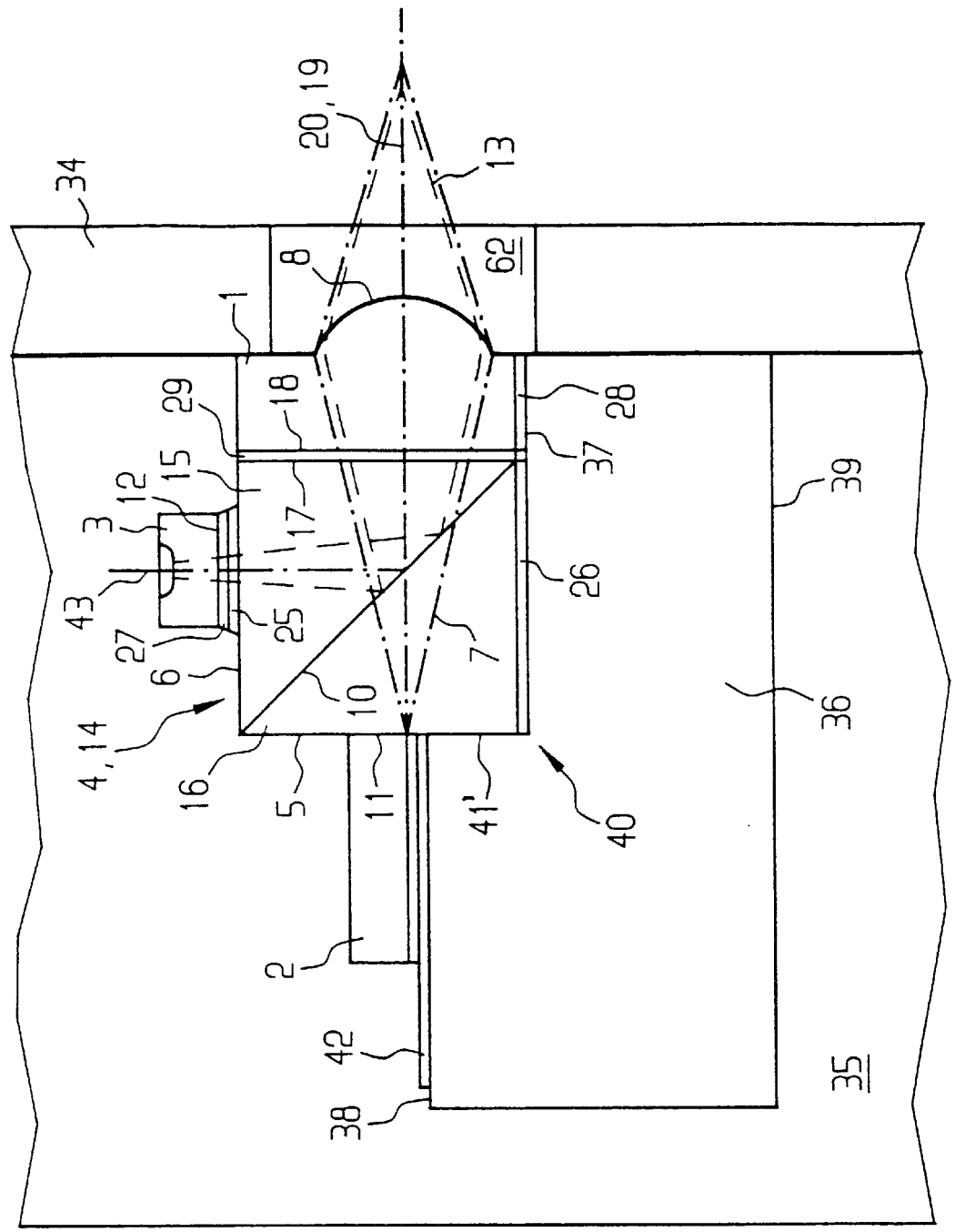
FIG. 2 is a fragmentary, sectional view of a second exemplary embodiment of an optoelectronic module according to the invention.
Figure 6:
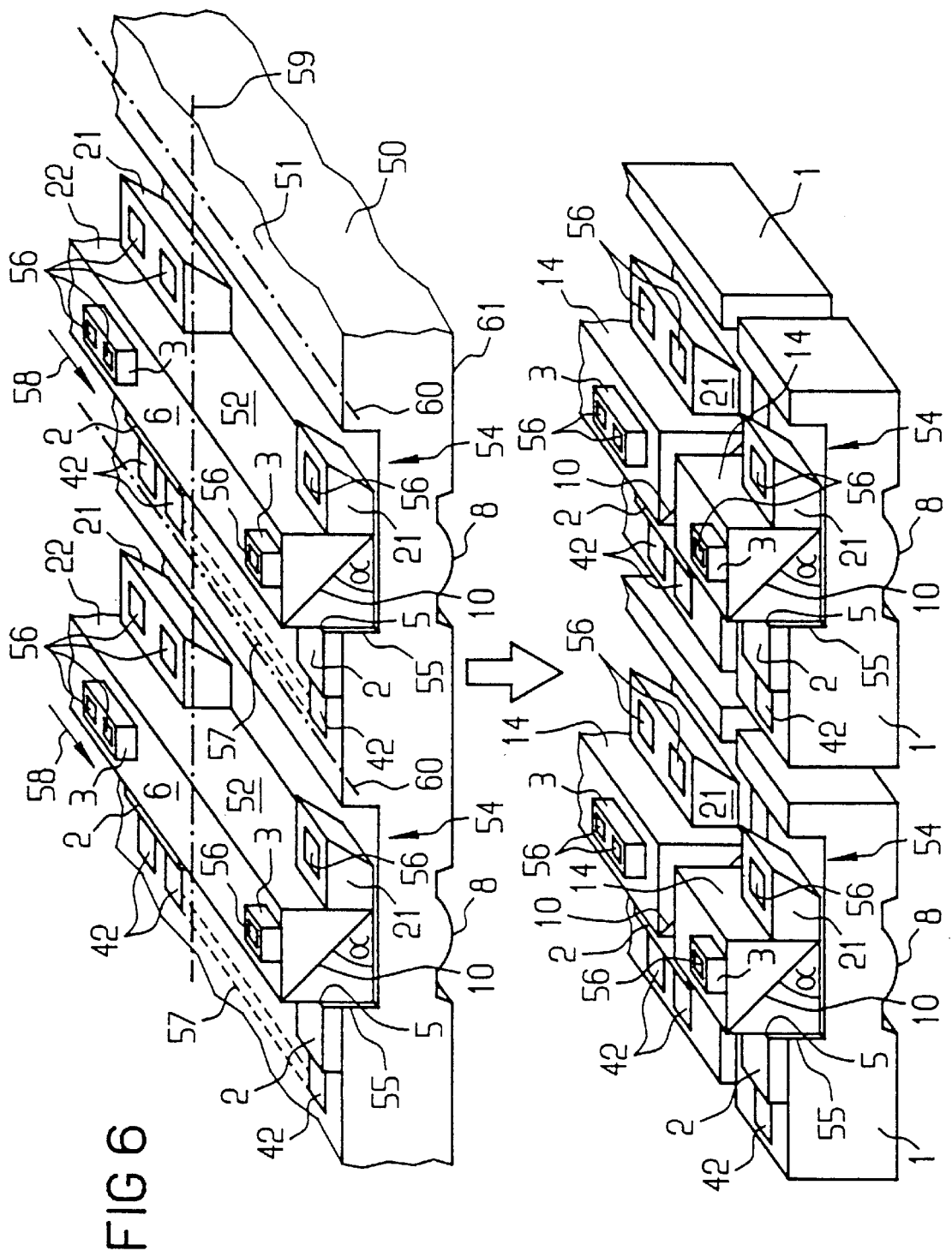
FIG. 6 is a fragmentary, perspective view illustrating a course of a method for simultaneously producing a plurality of optoelectronic modules in accordance with the exemplary embodiment of FIG. 1.

A transmit component 2, for example a Fabry-Perot laser or a DFB laser, that is to say an edge emitter, is fastened to the first main surface 30 of the carrier part 1 adjacent a first side surface 5 of the prism cube 14 in such a way that a beam-exit surface 11 of the transmit component 2 is parallel to the first side surface 5 of the prism cube 14. A solder or an adhesive, for example, is used as a connecting device 33 between the transmit component 2 and the carrier part 1. As is shown in FIG. 2 and FIG. 6, structured metallic coatings 42 which are connected to electric terminals of the transmit component 2 and serve as external electric terminals for the transmit component 2, are optionally applied to the first main surface 30 of the carrier part 1. For this purpose, the transmit component 2 can rest directly on the metallic coatings 42 with its electric terminals, and can be connected in an electrically conducting manner to the metallic coatings, for example through the use of a solder.

The transmit component beam-exit surface 11 can optionally rest directly on the first side surface 5 of the prism cube or else be disposed at a spacing therefrom. In the latter case, as is shown in FIG. 1, an interspace between the beam-exit surface 11 and the first side surface 5 of the prism cube 14 can be filled with a radiation-transparent coupling medium 24 having a refractive index which is higher than that of air. It is thereby possible to reduce reflection losses due to strongly differing refractive indices of air and semiconductor material or the material of the prism cube. Ideally, the transmit component beam-exit surface 11 is in physical contact with the first side surface 5.

A receive component 3, for example a photodiode, is fastened through the use of a radiation-transparent connecting device 25 to a second side surface 6 of the prism cube 14 which is perpendicular to the first side surface 5 and parallel to the first main surface 30 of the carrier part 1. A beam-entry surface 12 of the receive component 3 faces the second side surface 6. Ideally, the receive component beam-entry surface 12 in turn makes physical contact with the second side surface 6. The prism cube 14 is disposed in such a way that the beam-splitter layer 10 lies in a plane which is disposed between the transmit component 2 and the receive component 3 and which encloses an angle of 45° with the first main surface 30 of the carrier part 1. The prism cube 14 also has a third side surface 17.

A monitor diode 21 is fastened through the use of a connecting device 34, for example a metallic solder or an adhesive, to the side of the prism cube 14 opposite the transmit component 2, likewise in the cutout 31 of the carrier part 1. This monitor diode 21 serves essentially to check the wavelength of radiation 7 emitted by the transmit component 2. For this purpose, the beam-splitter layer 10 is constructed in such a way that it allows a portion of the emitted radiation 7 to pass through.

The monitor diode 21 is disposed in such a way that a monitor-diode beam-entry surface 23 faces a fourth side surface 22 of the prism cube 14 which is opposite the first side surface 5. An interspace between the fourth side surface 22 of the prism cube 14 and the monitor-diode beam-entry surface 23 is filled by a transparent coupling medium 26, for example a transparent epoxy resin. Reflection losses in the radiation on the way to the monitor diode 21 can thereby be reduced.

The monitor diode 21 has a side surface 44 opposite the monitor-diode beam-entry surface 23. The side surface 44 is beveled in such a way that it reflects at least a portion of the radiation penetrating into the monitor diode 21 to a radiation-detecting pn junction 45 of the monitor diode 21. The side surface 44 and a side surface 46 of the monitor diode 21 closest to the pn junction 45 enclose an angle which is smaller than 90°. It can also be provided, for example, with a layer which increases reflection.

The transmit component 2, the receive component 3, the prism cube 14 and the radiation-focusing device 8 are constructed and disposed relative to one another in such a way that during operation of the optoelectronic module at least a portion of the radiation 7 emitted by the transmit component 2 is coupled, after passing through the radiation-focusing device 8, into an optical device 9 disposed downstream of the radiation-focusing device 8 when seen in the direction of propagation of the emitted radiation 7. In addition, at least a portion of received radiation 13 extracted or released from the optical device 9 is coupled, after passing through the radiation-focusing device 8 and through the prism cube 14, into the receive component 3.

For this purpose, the prism cube 14 is produced from a material that is transparent to the emitted radiation 7 and the received radiation 13 (for example quartz, borosilicate glass, sapphire or semiconductor material (compare in this connection, for example, the semiconductor materials specified below for the carrier part)). The beam-splitter layer 10 is constructed in such a way that it for the most part reflects the emitted radiation 7 and allows the received radiation 13 to pass through as far as possible. Such beam-splitter layers 10 are known in optical technology, for example 3dB splitters or WDM (Wavelength Division Multiplex) filters, and therefore are not explained in more detail at this juncture. An anti-reflective coating 48 (illustrated by dashes) is optionally applied to the side surfaces 5, 6, 17, 22 of the prism cube.

A beam axis 19 of the emitted radiation 7 and a beam axis 20 of the received radiation 13 are perpendicular to one another in this exemplary embodiment.

For the sake of completeness, it may be mentioned at this juncture that the emitted radiation 7 and the received radiation 13 advantageously have different wavelengths $\lambda$. This holds for all of the exemplary embodiments of the optoelectronic module according to the invention which are described in this application.

As is indicated in FIG. 1, the optical device 9 is, for example, an optical fiber, a lens configuration or a further optoelectronic module, etc.

The carrier part 1 including the radiation-focusing device 8 is formed of a material which is likewise transparent both to the emitted radiation 7 and to the received radiation 13. Materials which are suitable for this purpose are, for example, glass, plastic, sapphire, diamond or a semiconductor material which is transparent to the emitted radiation 7 and to the received radiation 13. In this regard, use may be made, for example, of SiC for a wavelength $\lambda > 400$ nm, of GaP for $\lambda > 550$ nm, of GaAs for $\lambda > 900$ nm and of silicon for $\lambda > 1100$ nm.

The radiation-focusing device 8 can be, for example, a collector lens with a spherical or aspherical surface which is produced by etching or grinding. It is likewise possible to use as the radiation-focusing device 8 a diffractive optical element, a holographic optical element or a Fresnel lens which is produced by etching, grinding or milling. The cutout 31 is produced, for example, by etching or milling.

The cutout 31 can alternatively also be realized through the use of two separately produced molded parts which are fastened to the carrier part 1 at a spacing from one another. As an alternative to what has been described above, it is likewise also possible for the radiation-focusing device 8 to be produced separately and fastened to the carrier part 1, for example through the use of a radiation-transparent solder or adhesive. If the carrier part 1 is formed of $\alpha$-Si and the radiation-focusing device 8 of glass, these two components can also be connected through the use of anodic bonding.

The carrier part 1, together with the individual parts (transmit component 2, prism cube 14 with receive component 3, radiation-focusing device 8 and, if appropriate, monitor diode) fastened to it, is fastened to a carrier plate 34 through the use of a connecting device 47 (for example solder or adhesive) in such a way that the second main surface 32 of the carrier part 1 faces the carrier plate 34.

The carrier plate 34 is, for example, a mounting plate of a lead frame, for example a Cu lead frame. The carrier plate 34 has electric terminal lugs 64 shown in FIG. 4 and a bore 62 above which or in which the radiation-focusing device 8 is disposed. An optical fiber connecting device 41, which is disposed on the side of the carrier plate 34 opposite the carrier part 1, has an optical fiber acting as the optical device 9. The optical fiber connecting device 41 is fastened, for example, to the carrier plate 34 through the use of welding, soldering or bonding. The optical fiber is disposed in this case over the bore 62 so that the transmitted radiation 7 from the radiation-focusing device 8 is essentially focused onto an end surface of the optical fiber.

The overall functional unit having the active components of the optoelectronic module, that is to say the transmit component 2, the receive component 3, the monitor diode 21 and the prism cube 14, is provided with a sealing jacket 35 formed essentially of plastic or of another suitable sealing material, for example with epoxy resin or with another suitable plastic. In order to match the thermal expansion coefficient, the sealing material can be filled, for example, with a suitable filler, for example metal powder, metal oxide powder, metal carbonate powder or metal silicate powder.

An optoelectronic module constructed in such a way constitutes a very simple embodiment of a bidirectional transmit and receive module for optical message transmission through the use of a single optical fiber. As is shown in FIG. 5, it can be advantageously constructed very simply as a surface-mounting component (i.e., a Surface Maint. Technology (SMT) assembly). If required, additional electronic components can also be contained within the sealing jacket 35 such as, for example, a preamplifier for the photodiode or a laser driver, etc. Of course, for high mechanical loading a hermetically sealed metal housing with an optical window can be used in addition to the sealing jacket 35.

The exemplary embodiment of the optoelectronic module according to the invention which is represented in FIG. 2 differs from the exemplary embodiment in accordance with FIG. 1 particularly in that the radiation-focusing device 8 is disposed on the side of the prism cube 14 opposite the transmit component 2, and in that the beam-splitter layer 10 is constructed in such a way that it for the most part allows the emitted radiation 7 to pass through and that it for the most part reflects the received radiation 13. The beam axis 19 of the transmitted radiation 7 and the beam axis 20 of the received radiation 13 extend parallel to one another and in particular are situated on one another. A beam axis 43 of a portion of the received radiation 13 reflected at the beam-splitter layer 10 is perpendicular to the beam axis 19 of the received radiation 13.

The transmit component 2, the prism cube 14 and the radiation-focusing device 8 are fastened, for example through the use of bonding or soldering, to a common carrier element 36 which is formed, for example, essentially of silicon. The carrier element 36 has a step 40 which separates a first mounting surface 37 and a second mounting surface 38 parallel thereto from one another.

The prism cube 14 is disposed on the first mounting surface 37 adjacent an end surface 41' which is perpendicular to the mounting surfaces 37, 38 of the step 40. Moreover, the radiation-focusing device 8 is fastened to the first mounting surface 37 through the use of a connecting device 28 in such a way that its beam-entry and beam-exit surface 18 is parallel to the third side surface 17 of the prism cube 14 and faces the latter. In this exemplary embodiment, there is a gap which is filled with a transparent coupling medium 26, for example synthetic resin, between the radiation-focusing device 8 and the prism cube 14. Of course, it is likewise also possible for the radiation-focusing device 8 to make physical contact with the prism cube 14 and ideally to bear directly against the prism cube 14.

The transmit component 2 is fastened to the second mounting surface 38 in such a way that its beam-exit surface 11 faces the prism cube 14 and bears directly against the first side surface 5 thereof. Of course, it is likewise possible, as in the case of the exemplary embodiment of FIG. 1, for there to be a gap between the transmit component 2 and the prism cube 14 which is filled with a transparent coupling medium 24, for example synthetic resin, for the purpose of reducing reflection. It is also possible for there to be physical contact.

The metallic coatings 42 are applied to the second mounting surface 38. These coatings are connected in an electrically conducting manner to electric contacts of the transmit component 2. For this purpose, the transmit component 2 and the metallic coatings 42 are constructed, for example, in such a way that electric contacts of the transmit component 2 and the metallic coatings 42 rest on one another and are connected to one another, for example, through the use of a metallic solder or through the use of an electrically conducting adhesive. The metallic coatings 42 then serve simultaneously as external electric terminals for the transmit component 2, which are then connected to a lead frame, for example through the use of bonding wires. Of course, it is likewise also possible for electric contacts of the transmit component 2 to be connected through the use of bonding wires to the metallic coatings 42 or directly to a lead frame. A similar statement holds for the exemplary embodiment of FIG. 1. There, as well, corresponding metallic coatings 42 can be provided on the carrier part 1.

Furthermore, in the exemplary embodiment of FIG. 2, a blocking filter 27 is disposed between the receive component 3 which is disposed on the prism cube 14, and the prism cube 14. The blocking filter 27 is as far as possible non-transparent to the wavelength of the emitted radiation 7. The crosstalk attenuation of the optoelectronic module can thereby be lowered. "Crosstalk" is direct transmission to the receive component 3 of signals emitted by the transmit component 2. The blocking filter 27 can optionally be applied to the receive-component beam-entry surface 12 or to the second side surface 6 of the prism cube 14. Furthermore, if necessary for optical reasons, a collector lens can be disposed between the receive-component beam-entry surface 12 and the prism cube 14.

If a laser diode is used as transmit component 2, it can be mounted with the upside up or with the upside down, that is to say in the direction of the carrier element 36. In the latter case, the thickness of the laser diode substrate must be matched very accurately to the position of the beam-splitter layer 10. This entails a high outlay for mounting and adjustment. In the former case, by contrast, only the thickness of the epitaxy layer of the laser diode and the thickness of any electrical-terminal metallic coatings 42 present on the carrier element 36 figure in this consideration. Manufacturing tolerances can be kept very simply in the micrometer range and below in this case. The adjustment is greatly simplified thereby. A similar statement also holds, of course, for the exemplary embodiment of FIG. 1 described above.

Figure 3:
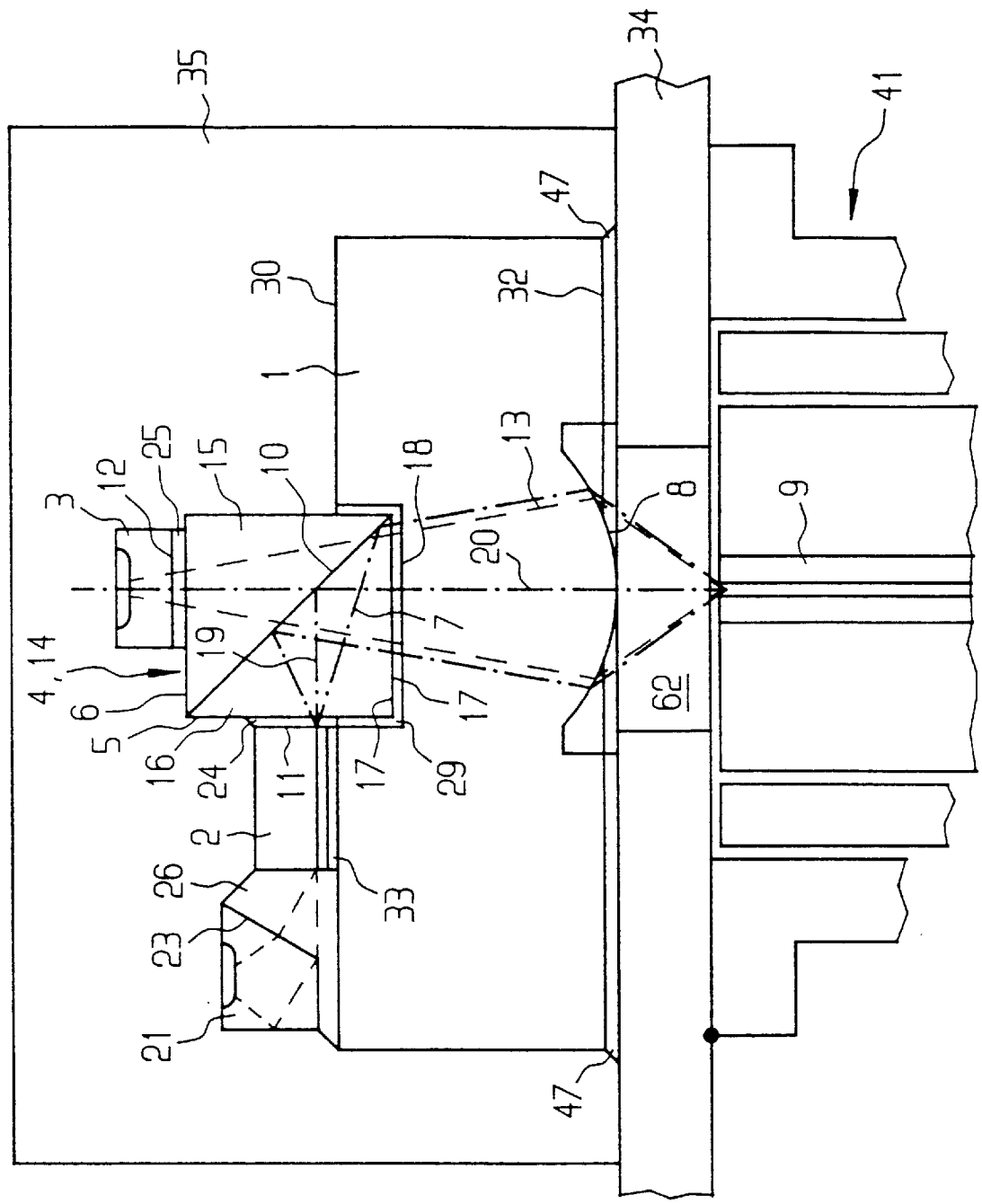
FIG. 3 is a fragmentary, sectional view of a third exemplary embodiment of an optoelectronic module according to the invention.

If a monitor diode 21 is also provided in this exemplary embodiment, it can be disposed, as in the case of the exemplary embodiment of FIG. 3, on the second mounting surface 38 behind the transmit component 2, as seen from the prism cube 14. A portion of the radiation generated in the transmit component 2 must then, of course, be extracted or released rearward, and in the case of the use of a laser diode as the transmit component 2, this entails a worsening of the laser parameters, since the rear resonator mirror also has to be constructed in a partly transparent manner. The exemplary embodiment of FIG. 1 does not have this disadvantage. In this case, the rear mirror of a laser diode used as the transmit component 2 can be constructed for high reflection.

In contrast with the exemplary embodiment of FIG. 1, as already indicated further above, in the exemplary embodiment of FIG. 3 the monitor diode 21 is disposed behind the transmit component 2, seen from the prism cube 14. Otherwise, there is no essential difference between these two exemplary embodiments.

FIG. 4 shows a lead frame 70 such as can be used, for example, for the optoelectronic module according to the invention. This lead frame has the carrier plate 34 with the bore 62 and a mounting surface 66 for the functional units. A total of eight of the electric terminal lugs 64 which extend outward from the carrier plate 34 also extend essentially parallel to one another in a plane and are connected to one another through a web 65. The middle one of these terminal lugs 64, to which the carrier plate 34 is fastened, has a crank in the vicinity of the carrier plate, with the result that the carrier plate 34 is disposed offset relative to the plane of the terminal lugs 64. Ends of the remaining terminal lugs 64, which are directed towards the carrier plate 34, are provided for the electric terminals of the functional units and are not connected to the carrier plate 34. This lead frame is, for example, a conventional Cu lead frame.

In the optoelectronic module according to the invention which is represented in FIG. 5, a functional unit including a transmit component 2, a receive component 3, a prism cube 14, a radiation-focusing device 8, a carrier part 1, a monitor diode if appropriate, and further components (for example an amplifier, etc.) if appropriate, is fastened to the carrier plate 34. These elements are enclosed, together with the carrier plate 34 and subregions of the terminal lugs 64, by the sealing jacket 35. The sealing jacket 35 has a cutout 63 on the side of the carrier plate 34 opposite the functional unit, which reaches as far as the carrier plate 34 and in which the optical-fiber connecting device 41 is fastened to the carrier plate 34.

This optical-fiber connecting device 41 is, for example, a conventional receptacle connection or a pigtail connection. A metal sleeve 68 is welded onto the carrier plate 34 by a welding ring 67. A ceramic sleeve 69 is located in the metal sleeve 68 for the exact guidance of an optical fiber. A fastening device for a plug can be pushed over the sealing jacket 35 in order to fix the plug in the axial direction of the optical fiber.

The terminal lugs 64 project at a side surface of the sealing jacket 35. The lugs are bent over uniformly by 90° twice outside the sealing jacket 35. The first 90° bend extends in the direction opposite to that of the extent of the optical fiber connecting device 41, the second 90° bend extends towards the middle of the component, that is to say once again having the same bending direction, and there is a spacing between the first and second bend, with the result that a soldering terminal surface 69 is constructed for each terminal lug 64. The web 65 between the adjacent terminal lugs 64 is severed in each case. As a result, the optoelectronic module according to the invention is constructed in a simple way as an SMD component.

FIG. 6 diagrammatically illustrates a course of a method for simultaneously producing a plurality of optoelectronic modules in accordance with the exemplary embodiment of FIG. 1. A number of rectangular grooves 54 extending at a spacing parallel to one another are produced in a first main surface 51 of a wafer 50. The portion of the wafer 50 which is shown in FIG. 6 has four functional units, with the two front ones being presented in section.

A number of radiation-focusing devices 8 are constructed in accordance with a prescribed matrix on a second main surface 61 of the wafer 50, which is opposite the first main surface 51. In this case, the devices are spherical or have aspherical lenses that are produced, for example, through the use of etching or grinding. The radiation-focusing devices 8 are disposed in rows which extend parallel to the grooves 54 and are situated opposite the latter perpendicularly. The wafer 50 is formed of a material that is transparent to the emitted radiation 7 and the received radiation 13. A comparison may be made in this regard with the description of FIG. 1.

A prism bar 52 of square cross-section is fastened in each groove 54, adjacent a first groove side surface 55. The first groove side surface 55 can serve in this case as an adjusting reference surface for the first side surface 5 of the prism bar 52. Each prism bar 52 has a beam-splitter layer 10, which is on a diagonal cutting surface, parallel to its longitudinal central axis, of the prism bar 52. An angle α between the beam-splitter layer 10 and the first main surface 51 of the wafer 50 is thus 45°.

If the prism bar 52 is formed, for example, of glass and the wafer 50 of α-silicon, or vice versa, anodic bonding can be used, instead of the connection specified above using a connecting device 29, for fastening the prism bar 52 on the wafer 50. In this technique, the surfaces to be connected are laid on one another, they are heated, for example to approximately 450° C., and a voltage of approximately −1000 V is applied between the glass and silicon. This connecting technique is also possible whenever the wafer 50 also is formed of glass or some other material and has an α-silicon layer at the connecting site to the prism bar 52. Only one glass layer and one α-silicon layer need be situated on one another.

A multiplicity of transmit components 2 are fastened to the first main surface 51 of the wafer 50 adjacent the first side surfaces 5 in such a way that electric contacts of the transmit component 2 come to be situated on and electrically connected to the metallic coatings 42 which are provided for this purpose and are applied to the first main surface 51 of the wafer 50. In this case, each side surface 5 can serve as an adjusting reference surface for the transmit component 2. The transmit components 2 are disposed in such a way that each is assigned a radiation-focusing device 8.

In order to ensure reliable separation of the p and n contacts of laser-diode transmit components, or to avoid damaging the web in the case of the use of lasers with ridge waveguides (MCRW lasers), a separation groove is formed, for example etched in, in each case between the metallic coatings 42 before mounting the transmit components 2.

A plurality of receive components 3 with electric contacts 56 are fastened in each case to the second side surfaces 6 of the prism bar 52. The contacts are also disposed in such a way that each is assigned a radiation-focusing device 8.

In a manner similar thereto, a plurality of monitor diodes 21 with electric contacts 56 are fastened in the groove 54, in each case adjacent the fourth side surface 22 opposite the first side surface 5.

When laser diodes are used as transmit components 2, the latter can be connected serially through the use of metallic tracks 57 (illustrated by dashes in FIG. 6) on the first main surface 51 of the wafer 50. The result is that the so-called burn-in of the laser diodes only requires contact to be made in each case with two outer metallic coatings or contact surfaces 42 disposed at two ends of individual laser diode rows 58. The burn-in for the laser diodes assigned to the same laser diode row 58 can thus be carried out simultaneously in a particularly simple way. Moreover, the individual transmit components 2 and receive components 3 can also be measured with a view to their electro-optic parameters by making contact with the associated metallic coatings 42, 56 and connection to a suitable wafer tester in a wafer assembly, that is to say during use. A similar statement also holds, of course, for the monitor diodes 21.

After these method steps, the wafer 50 and the prism bars 52 are then severed along first separating lines 59, which extend between the individual transmit components 2 perpendicular to the grooves 54, and the wafer 50 is severed along second separating lines 60, which extend in each case between two grooves 54. The individual devices that are thus produced, which have a transmit component 2, a receive component 3, a monitor diode 21, a prism cuboid 14 and a radiation-focusing device 8 with a carrier part 1 in each case, are subsequently mounted on a lead frame in each case and sealed by a sealing jacket 35 (compare FIGS. 4 and 5 in this regard).

Given slight modifications, the method described above can, of course, also be used for the two further exemplary embodiments of FIG. 2 and FIG. 3. It permits cost effective production in conjunction with a high mounting efficiency at the same time, and a 100% check of all of the important operating parameters of the optoelectronic module in use, that is to say in a wafer assembly.

I claim:

1. In an assembly having an optical device for receiving and emitting radiation, an optoelectronic module coupled optically to the optical device for bidirectional optical data transmission, comprising:
   a functional unit including a transmit component for emitting radiation, a receive component for receiving radiation and a beam-splitter device;
   a radiation-focusing device for focusing radiation emitted from said transmit component and emitted from the optical device, said beam-splitter device and the optical device being disposed on respectively different sides of said radiation-focusing device; and
   a carrier part for carrying said functional unit, said carrier part having mutually opposite first and second main surfaces, said transmit component and said beam-splitter device being fastened to said first main surface and said receive component being fastened to said beam-splitter device.

2. The optoelectronic module according to claim 1, wherein said beam-splitter device has a beam-splitter layer and is a molded part formed substantially of a material transparent to the emitted radiation and the received radiation, said molded part has at least a first side surface, a second side surface and a third side surface, said first side surface and said second side surface are inclined relative to one another, said third side surface is inclined relative to one of said first and second side surfaces, and said beam-splitter layer is embedded in said molded part.

3. The optoelectronic module according to claim 2, wherein said first side surface and said third side surface are opposite side surfaces of said molded part.

4. The optoelectronic module according to claim 2, wherein said second side surface and said third side surface are opposite side surfaces of said molded part.

5. The optoelectronic module according to claim 2, wherein said transmit component has a beam-exit surface facing and bearing against said first side surface of said molded part, said receive component has a beam-entry surface facing and bearing against said second side surface of said molded part, and said radiation-focusing device has a beam entry-exit surface facing and bearing against said third side surface of said molded part.

6. The optoelectronic module according to claim 2, including a radiation-transparent connecting device, said transmit component having a beam-exit surface, said receive component having a beam-entry surface, and said radiation-focusing device having a beam entry-exit surface, said radiation-transparent connecting device connecting said beam-exit surface to said first side surface of said molded part, connecting said beam-entry surface to said second side surface of said molded part, and connecting said beam entry-exit surface to said third side surface of said molded part.

7. The optoelectronic module according to claim 6, wherein said radiation-transparent connecting device is one of at least three radiation-transparent connecting devices including a first radiation-transparent connecting device connecting said beam-exit surface to said first side surface of said molded part, a second radiation-transparent connecting device connecting said beam-entry surface to said second side surface of said molded part, and a third radiation-transparent connecting device connecting said beam entry-exit surface to said third side surface of said molded part.

8. The optoelectronic module according to claim 2, wherein said first side surface and said second side surface are perpendicular to one another, said third side surface and one of said first side surface and said second side surface are perpendicular to one another, and said third side surface and the other of said first side surface and said second side surface are parallel to one another.

9. The optoelectronic module according to claim 2, wherein said molded part includes at least two joined optical prisms, and said beam-splitter layer is disposed between said at least two optical prisms.

10. The optoelectronic module according to claim 2, wherein said molded part is cuboid and has a diagonal cutting surface and a rectangular cutting surface disposed perpendicular to said beam-splitter layer, and said beam-splitter layer is disposed in said diagonal cutting surface.

11. The optoelectronic module according to claim 10, wherein said rectangular cutting surface is square.

12. The optoelectronic module according to claim 2, including a monitor diode having a diode beam-entry surface, said molded part having a fourth side surface, said diode beam-entry surface facing said fourth side surface, said beam-splitter layer causing a portion of the emitted radiation to impinge on said diode beam-entry surface.

13. The optoelectronic module according to claim 12, including a lead frame connected to said functional unit, said lead frame having electric terminal lugs electrically connected to said transmit component and said receive component and a carrier plate with a bore formed therein, said radiation-focusing device associating with said bore, said transmit component, said molded part and said monitor diode fastened to said first main surface of said carrier part, and said second main surface of said carrier part fastened to said carrier plate.

14. The optoelectronic module according to claim 13, including a sealing jacket, said carrier plate having electric terminal lugs with subregions, said sealing jacket enclosing said transmit component, said receive component, said beam-splitter device, said radiation-focusing device, said carrier plate, said carrier part, said subregions and said monitor diode, and said sealing jacket having a cutout formed therein reaching as far as said carrier plate on a side of said carrier plate opposite said functional unit in the vicinity of said bore.

15. The optoelectronic module according to claim 14, wherein said sealing jacket has side surfaces, said electric terminal lugs project out of said sealing jacket through one of said side surfaces, and all of said electric terminal lugs are bent outside said sealing jacket at least once by 90° in the same direction, defining a surface-mounting structure.

16. The optoelectronic module according to claim 14, wherein said sealing jacket has mutually opposite side surfaces and a middle, said electric terminal lugs project out of said sealing jacket through said mutually opposite side surfaces, and all of said electric terminal lugs are bent outside said sealing jacket firstly by 90° in the same direction and then by 90° inward in the direction of said middle defining a surface-mounting structure.

17. The optoelectronic module according to claim 14, wherein said sealing jacket has mutually opposite side surfaces and a middle, said electric terminal lugs project out of said sealing jacket through said mutually opposite side surfaces, and all of said electric terminal lugs are bent outside said sealing jacket firstly by 90° in the same direction and then outward away from the module defining a surface-mounting structure.

18. The optoelectronic module according to claim 14, including an optical-fiber connecting device fastened to said carrier plate in said cutout.

19. The optoelectronic module according to claim 2, wherein:

the emitted radiation and the received radiation have substantially parallel beam axes;

said beam-splitter layer allows a portion of the emitted radiation to be coupled into the optical device to pass through and for the most part reflects the received radiation and deflects it to said receive component; and said radiation-focusing device and said transmit component are disposed on opposite sides of said molded part.

20. The optoelectronic module according to claim 2, wherein:

said receive component has a beam-entry surface;

the emitted radiation and the received radiation have substantially perpendicular beam axes; and said beam-splitter layer at least for the most part reflects the emitted radiation along a beam axis substantially parallel to the beam axis of the received radiation, and allows at least a portion of the received radiation to pass through and impinge upon said beam-entry surface.

21. The optoelectronic module according to claim 2, including a blocking filter substantially non-transparent to a wavelength of the emitted radiation, said blocking filter disposed between said receive component and said second side surface of said molded part.

22. The optoelectronic module according to claim 1, wherein said beam-splitter device is a molded part, said beam-splitter device is fastened to said carrier part by a radiation-transparent connecting device.

23. The optoelectronic module according to claim 1, wherein said carrier part is formed substantially of a material transparent to the emitted radiation and the received radiation, said carrier part has a plurality of sides, and said transmit component and said optical device are disposed on different sides of said plurality of sides of said carrier part.

24. The optoelectronic module according to claim 1, wherein said carrier part is constructed in one piece together with said radiation-focusing device.

25. The optoelectronic module according to claim 1, including a lead frame connected to said functional unit, said lead frame having electric terminal lugs electrically connected to said transmit component and said receive component.

26. The optoelectronic module according to claim 25, wherein said lead frame has a carrier plate with a bore formed therein, said radiation-focusing device is associated with said bore, and said second main surface of said carrier part is fastened to said carrier plate.

27. The optoelectronic module according to claim 26, including a sealing jacket, said carrier plate having electric terminal lugs with subregions, said sealing jacket enclosing said transmit component, said receive component, said beam-splitter device, said radiation-focusing device, said carrier plate, said carrier part and said subregions, and said sealing jacket having a cutout formed therein reaching as far as said carrier plate on a side of said carrier plate opposite said functional unit in the vicinity of said bore.

28. The optoelectronic module according to claim 27, wherein said sealing jacket has side surfaces, said electric terminal lugs project out of said sealing jacket through one of said side surfaces, and all of said electric terminal lugs are bent outside said sealing jacket at least once by 90° in the same direction, defining a surface-mounting structure.

29. The optoelectronic module according to claim 27, wherein said sealing jacket has mutually opposite side surfaces and a middle, said electric terminal lugs project out of said sealing jacket through said mutually opposite side surfaces, and all of said electric terminal lugs are bent outside said sealing jacket firstly by 90° in the same direction and then by 90° inward in the direction of said middle defining a surface-mounting structure.

30. The optoelectronic module according to claim 27, wherein said sealing jacket has mutually opposite side surfaces and a middle, said electric terminal lugs project out of said sealing jacket through said mutually opposite side surfaces, and all of said electric terminal lugs are bent outside said sealing jacket firstly by 90° in the same direction and then outward away from the module defining a surface-mounting structure.

31. The optoelectronic module according to claim 27, including an optical-fiber connecting device fastened to said carrier plate in said cutout.

32. The optoelectronic module according to claim 1, wherein said first main surface of said carrier part has a cutout including a base surface and said beam-splitter device is fastened on said base surface.

33. The optoelectronic module according to claim 1, wherein said beam-splitter device has a beam-splitter device side surface, and said transmit component is fastened to said first main surface of said carrier part adjacent said beam-splitter device side surface.

34. The optoelectronic module according to claim 1, wherein said beam-splitter device has a beam-splitter device side surface, and said transmit component has a beam-exit surface and is fastened to said first main surface such that said beam-exit surface is parallel to said beam-splitter device side surface.

35. The optoelectronic module according to claim 34, wherein said beam-exit surface rests directly on said beam-splitter device side surface.

36. The optoelectronic module according to claim 1, wherein said beam-splitter device has a beam-splitter device first side surface and a beam-splitter device second side surface perpendicular to said beam-splitter device first side surface and parallel to said first main surface of said carrier part, and said receive component is fastened on said beam-splitter device second side surface.

37. The optoelectronic module according to claim 1, including a radiation-transparent filling between said beam-splitter device and said transmit component and between said receive component and said beam-splitter device.

38. The optoelectronic module according to claim 37, wherein said radiation-transparent filling has a refractive index higher than a refractive index of air.

* * * * *